Sept. 3, 1929.  W. S. AMIDON  1,727,091
DOUGH DIVIDER
Filed Oct. 30, 1926  3 Sheets-Sheet 3

Inventor:
William S. Amidon, Deceased
by Fannie C. Amidon-Executrix.

By Attorneys

Patented Sept. 3, 1929.

1,727,091

UNITED STATES PATENT OFFICE.

WILLIAM S. AMIDON, DECEASED, BY FANNIE C. AMIDON, EXECUTRIX, OF JOLIET, ILLINOIS.

DOUGH DIVIDER.

Application filed October 30, 1926. Serial No. 145,260.

This invention relates to dough dividers.

Dough dividers, as heretofore constructed, have been extremely slow in their operation on the one hand, as they operated primarily by measuring the dough and gradually allowing it to fall or be sucked into pockets, so that the volumetric contents could be measured. These machines were necessarily, as stated, very slow in their operation, and could not be used efficiently for dividing dough into chunks suitable for the formation of rolls, buns, or other articles of this type.

Even when used in forming loaves of bread the machines were found to be extremely slow. Other types of machines have proven to be mechanically rough in the handling of the dough with consequent tearing and crushing of the fine, cellular structure of the dough, thus markedly interfering with the resulting product.

This invention is designed to overcome the defects noted above and objects of such invention are to provide a dough divider which will operate at a high speed, and is suitable for dividing dough for the formation of rolls, buns, or loaves of bread in an efficient and practical manner.

A further primary object of this invention is to provide a novel form of high speed dough divider which is so constructed that it does not crush or injure the dough but, instead, in which the dividing knife travels with a ribbon of dough and, consequently, does not tear or otherwise harm the structure of the dough. Further objects are to provide a dough divider in which the weight of the divided or separated chunks or pieces of dough can be very readily varied by a simple adjustment of the mechanism, so that the utmost accuracy in the proportioning may be secured.

Further objects are to provide a novel form of dough divider in which the dough receiving hopper may be swung upwardly out of the way to afford the utmost facility for cleaning the rolls and other portions of the apparatus.

Most specifically, objects of this invention are to provide a dough divider in which the dough is received in a hopper and is fed directly therefrom by rollers which determine the thickness of the strip of dough, and in which a reciprocating and bodily traveling knife cooperates with a continuously rotating roller to sever the dough strip into the pieces of the correct size without tearing the dough, as the knife quickly enters the strip of dough and travels bodily with the flowing ribbon or dough strip.

Further objects are to provide a practical, simple, and serviceable type of dough divider which will fulfill the long felt need of an accurate, easily cleaned, easily adjusted, and easily operated machine.

An embodiment of the invention is shown in the accompanying drawings in which.

Figure 1:
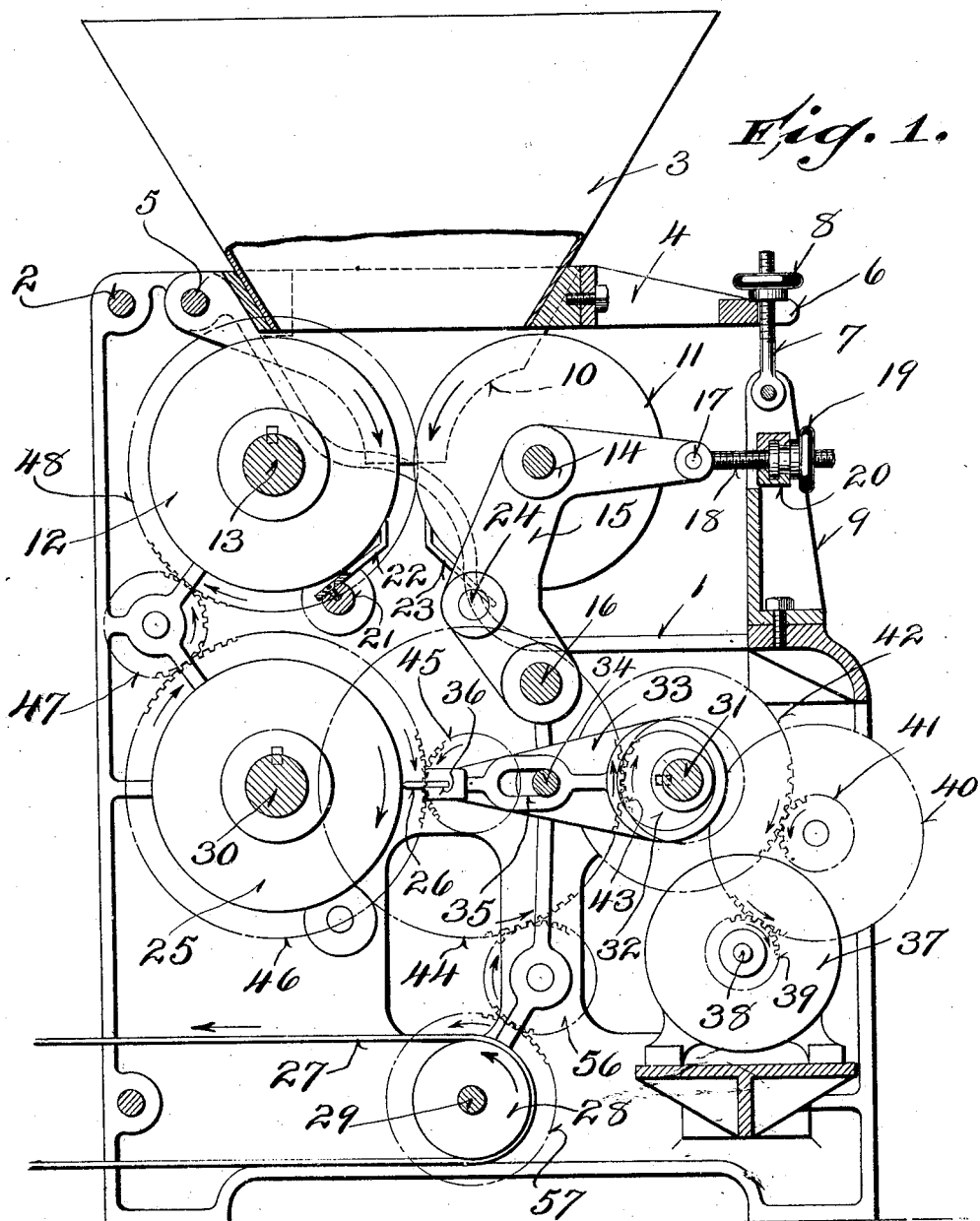
Figure 1 is a side elevation partly in section of the dough divider.
Figure 2:
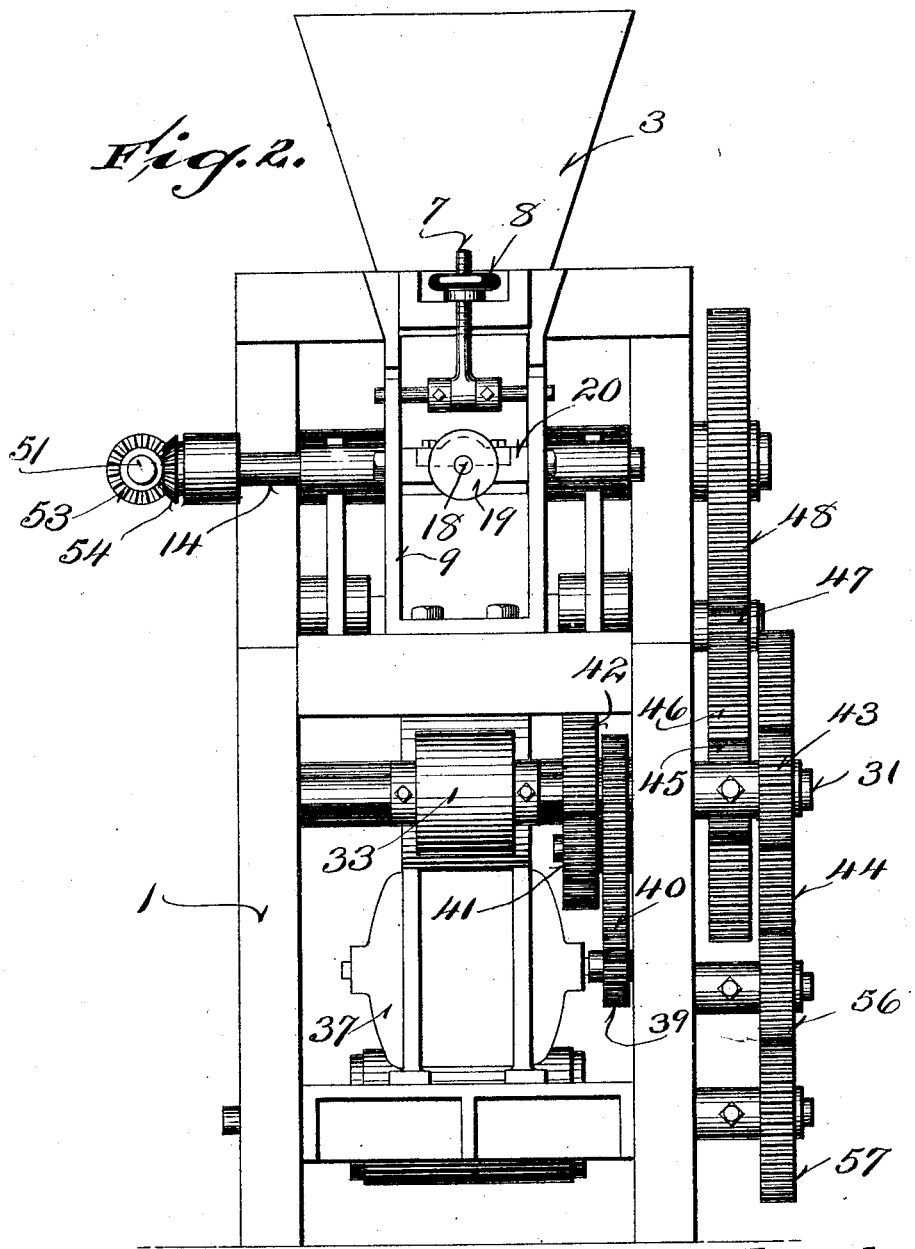
Figure 2 is an end view thereof.

Referring to the drawings, it will be seen that the machine comprises a pair of side frame members 1 which are spaced by suitable bolts or rods 2. These side frame members pivotally carry at their upper end a dough receiving hopper 3. The hopper may be mounted in a frame 4 which is pivoted, as indicated at 5, between the side frame members. This frame is provided with a notch 6 at its free end within which a locking bolt 7 is adapted to be swung. This bolt carries a hand wheel or nut 8, which locks the frame down, such bolt being pivoted to an upright 9, carried by the main frame of the machine, as most clearly shown in Figures 1 and 2. The hopper is provided with downwardly extending portions 10 which are positioned on opposite sides of the main rollers 11 and 12. The roller 12 is rigidly mounted upon the shaft 13, and such shaft is held against bodily motion. The other roller 11 is rigidly mounted upon the shaft 14, this shaft, however, having bodily motion, whereby the spacing of the rollers may be varied or adjusted, as desired. The shaft 14 is carried by a pair of levers 15 which are pivoted, as indicated at 16, upon a transverse shaft. The outer ends of the levers 15 are joined by means of the rod 17. This rod carries an adjusting bolt 18 which is received by the adjusting hand wheel or nut 19. This nut and the bolt 18 are mounted within a rocking, transverse bracket 20, pivotally mounted between the arms of the upright 9, as shown in Figures 1 and 2. Thus, by rotating the hand wheel 19 the exact spacing of the rollers may be secured in accordance with the sizes of ribbon which the rollers are intended to form from the dough.

A fixed rod 21 is carried by the side frame members adjacent the lower portion of the roller 12, and carries a scraping knife 22. A similar scraping knife 23 is rigidly carried by the rod 24, such latter rod being carried by the levers 15, and thus held in correct position with respect to the roller 11, irrespective of the adjustment of the levers.

The rollers 11 and 12 are mounted directly below the dough receiving hopper 13 and, consequently, as the rollers are driven, by means hereinafter described, they form the dough into a continuous, uniform ribbon or strip. This strip passes downwardly directly from the rollers and in front of a roller 25. A reciprocating and rocking knife 26 cooperates with the roller 25 and severs the ribbon of dough into pieces of the desired size for forming rolls or buns. It is, of course, to be understood that the machine may be adjusted to separate the dough into pieces suitable for the formation of loaves of bread. Inasmuch as the machine is high speed and wholly automatic in its action, it may be efficiently employed in forming buns and rolls at a material reduction in the total cost of such processes. The severed pieces fall upon a continuously traveling conveyor 27, and are thus conducted from the machine, such conveyor being driven by means of the pulley or roller 28, carried rigidly by the shaft 29.

It is to be noted that the roller 25 is positively driven by means of the shaft 30 upon which it is rigidly secured. Further, it is to be noted that the knife 26 travels inwardly into the ribbon of dough and also at the same time travels downwardly with the traveling ribbon, thus avoiding mechanically injuring or crushing the cellular structure of the dough and insuring a clean cut separation of the dough pieces from the main ribbon. Thus, the machine will handle dough without any injury and will divide it accurately into predetermined sizes with the greatest speed.

The means for securing the peculiar motion of the knife 26, referred to above, will now be described. A shaft 31 rigidly carries a cam 32 and the cam fits within the correspondingly apertured end of a lever 33. This lever is guided upon a shaft or pin 34 which is held in fixed position in the frame work of the machine. The lever is provided with an elongated slot 35 which receives the pin 34. The outer end of the lever is provided with a slot 35 within which the severing knife 26 is secured.

It is to be particularly noted that the outer end of the lever is considerably elongated and spaced from the slot 35. Consequently, as the cam rotates in the direction indicated by the arrow, the knife will be given a motion towards the roller 25 and downwardly so that it enters and severs the ribbon of dough and, in addition, travels downwardly with such ribbon. The knife is thereafter retracted and again rocked upwardly into its initial position.

The operation of the main parts of the machine have been described in detail above, and the drive for the several parts will now be described.

Figure 3:
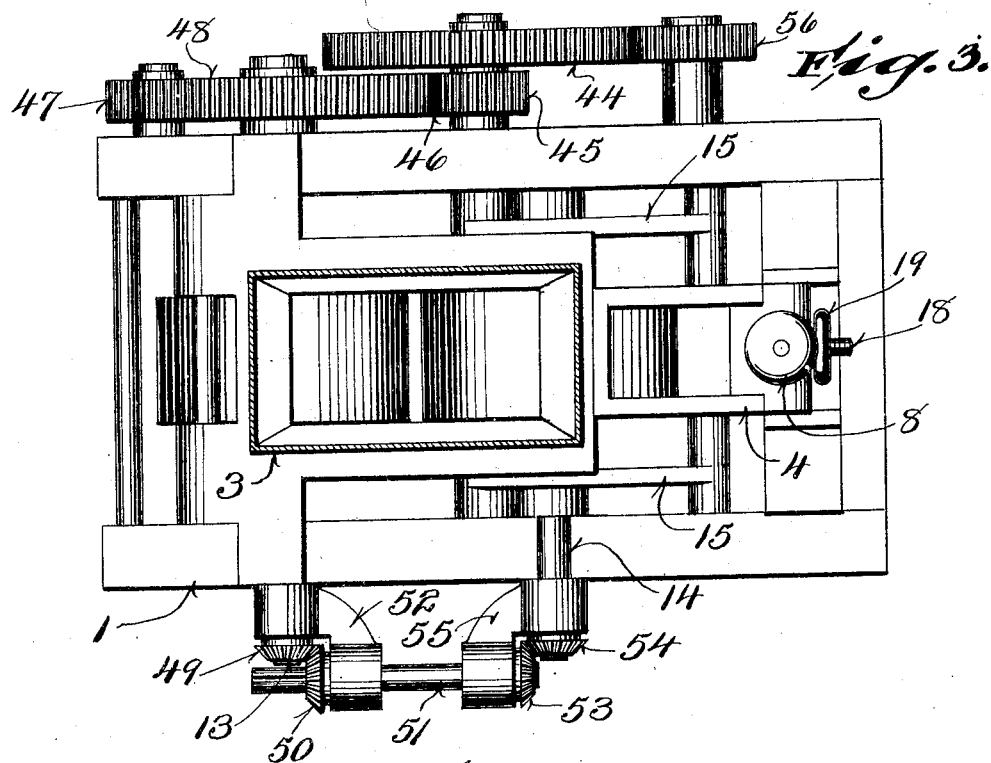
Figure 3 is a plan view with a portion of the hopper in section.
Figure 4:
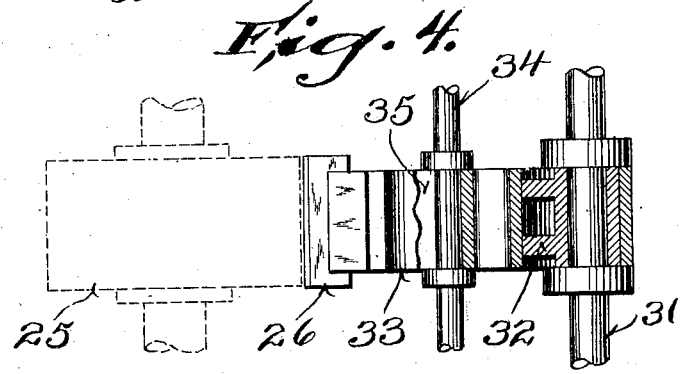
Figure 4 is a detail of the reciprocating and bodily traveling knife, such view being partly in section.

The machine is driven preferably from an electric motor 37 mounted upon a suitable bracket carried by the frame work of the machine. The driving shaft 38 of the motor carries the driving pinion 39 which meshes with the gear 40. The gear 40 is rigid with a pinion 41 which meshes with a gear 42 rigidly mounted upon the cam shaft 31. This cam shaft also carries a pinion 43 which meshes with the large gear 44. The large gear is rigid with a small pinion 45 which, in turn, meshes with the gear 46 rigidly mounted upon the shaft 30 of the roller 25. The big gear 46 further serves to transmit motion through the medium of the idler 47 to the gear 48 rigidly mounted upon the shaft 13 of the feeding roller 12. The shaft 13, as may be seen from Figure 3, projects through the frame of the machine and carries a bevel gear 49 at one of its outer ends. This bevel gear meshes with a similar bevel gear 50 slidably splined upon a shaft 51. It is to be noted that the gears 49 and 50 are carried in bearings formed in a bracket 52, so that these bevel gears will be held in mesh with each other in all adjustments of the roller. The shaft 51 is provided with a rigidly mounted bevel gear 53 which meshes with a corresponding bevel gear 54 rigidly mounted upon the shaft 14 of the roller 11. The gears 53 and 54 are carried in suitable bearings formed in the bracket 55. Thus, although the roller 11 may be moved towards or from the roller 12, nevertheless it is operatively coupled thereto at all times, so that both rollers are positively and uniformly driven.

The means for driving the conveyor 27 may comprise an idler gear 56 (see Figure 1) which meshes with the gear 44, previously described, and with a gear 57 rigidly mounted upon the shaft 29 of the conveyor roller or pulley 28.

It will be seen that the motor drives the entire apparatus, and that the gearing insures the correct relative speed of the several parts. The rollers 11, 12, and 25 all have the same peripheral speed to prevent tearing or injuring the dough. In addition to this, as previously set forth, the knife 26 when it enters the ribbon, also travels downwardly therewith.

It is to be noted further that the machine is very rapid in its operation and, consequently, will produce a very large number of similar pieces of dough.

It is to be seen further that the machine may be readily cleaned as the rollers may be drawn apart and as the hopper may be detached from the locking bolt and swung upwardly and backwardly out of the way.

Although the invention has been described in considerable detail, such description is intended as illustrative rather than limiting as the invention may be variously embodied and as the scope of such invention is to be determined as claimed.

I claim:

1. A dough divider comprising a pair of forming rollers adapted to form a ribbon of dough, said rollers being relatively adjustable so that the thickness of the ribbon may be varied, a roller past which the ribbon of dough travels, a cutter comprising a lever pivoted and slidably supported intermediate its ends, means for imparting a circular motion to the free end of the lever, and a knife carried by the other end of the lever and adapted to engage the dough strip and cooperate with the last mentioned roller, said knife having a compound motion and entering the dough ribbon and traveling with such dough ribbon during severing.

2. A dough divider comprising a main frame, a pair of rollers mounted within said frame and adapted to form dough into a continuous ribbon, a third roller mounted below said first mentioned roller, a cam, a rocking and reciprocatory lever operated by said cam and having a knife cooperating with said last mentioned roller and adapted to travel with the dough, said lever being pivoted and slidably mounted intermediate its ends about a point fixed with relation to said frame, and means positively connecting all of said rollers and said cam for correctly timing the travel of said rollers and the operation of said cam.

3. A dough divider comprising a hopper located at its upper end, a pair of forming rollers mounted below said hopper, a third roller mounted below said forming rollers, a cam shaft having a cam thereon, means for positively driving said cam shaft and all of said rollers at a predetermined relative rate, a lever having a portion surrounding said cam at one end and having a knife at the other end adapted to cooperate with said last mentioned roller, a pivot shaft cooperating with a slot formed intermediate the ends of said lever, whereby said lever is given a rocking and reciprocatory motion, and a conveyor mounted below said last mentioned roller and said knife, whereby a ribbon of dough is formed by said first mentioned rollers and is severed into pieces of predetermined sizes by said knife and said second mentioned roller, said conveyor receiving the severed pieces of dough.

In testimony that I claim the foregoing I have hereunto set my hand at Berlamont in the county of Van Buren and State of Michigan.

FANNIE C. AMIDON,
*Executrix of the Estate of William S. Amidon, Deceased.*